United States Patent [19]

Shimamune et al.

[11] Patent Number: 5,607,562
[45] Date of Patent: Mar. 4, 1997

[54] ELECTROLYTIC OZONE GENERATOR

[75] Inventors: Takayuki Shimamune, Tokyo; Isao Sawamoto, Kanagawa, both of Japan

[73] Assignee: Permelec Electrode Ltd., Kanagawa, Japan

[21] Appl. No.: 321,983

[22] Filed: Oct. 12, 1994

[30] Foreign Application Priority Data

Oct. 12, 1993 [JP] Japan .................................. 5-277339

[51] Int. Cl.$^6$ ...................................................... C25B 9/00
[52] U.S. Cl. ........................................................... 204/265
[58] Field of Search ................................... 204/252, 263, 204/260, 291, 282, 283

[56] References Cited

U.S. PATENT DOCUMENTS 4,332,662  6/1982  Pouli et al. ............................. 204/265
4,416,747  11/1983  Menth et al. ............................ 205/338
5,326,444  7/1994  Nakamatsu et al. ..................... 204/265

Primary Examiner—Kathryn Gorgos
Attorney, Agent, or Firm—Sughrue, Mion, Zinn, Macpeak & Seas

[57] ABSTRACT

An electrolytic ozone generator comprising anode chamber 3 and cathode chamber 4 partitioned by solid electrolyte 2, in which deionized water is electrolyzed in the cathode chamber while feeding air or oxygen-rich air to the cathode chamber through, for example, air holes 14. The air fed suppresses evolution of hydrogen gas thereby affording a saving of energy and eliminating the need a separate cooling mechanism. Furthermore, the air also decomposes ozone having entered the catholyte.

6 Claims, 2 Drawing Sheets

ELECTROLYTIC OZONE GENERATOR

FIELD OF THE INVENTION

The present invention relates to an electrolytic ozone generator for producing ozone through the electrolytic decomposition of water. More particularly, the invention relates to an electrolytic ozone generator which can be operated at a reduced electrolytic voltage without requiring any special cooling mechanism and which is also easy to handle.

BACKGROUND OF THE INVENTION

Production of ozone by electrolysis of water has hitherto been carried out, and high purity ozone in a high concentration can be obtained by the following two methods.

The first method comprises electrolysis of a solution containing a highly electronegative anion as an auxiliary electrolyte. The method is referred to as solution electrolysis. The second method comprises electrolysis of water using a high polymeric solid electrolyte. Although the former method achieves an extremely high current efficiency with proper selection of an electrode substance, a solution (electrolytic solution), electrolytic conditions, etc., the method is still under study in laboratories and has not yet been embodied into a practical and commercial apparatus because the electrolytic solution is very corrosive.

The latter method is the so-called solid electrolyte type or zero gap type electrolysis in which a perfluorocarbon sulfonic acid type cation exchange membrane is used as a solid electrolyte intimately sandwiched in between a cathode and an anode. This method involves no corrosive or dangerous substance except that which is ozone generated, and the apparatus therefor is relatively simple in structure and easy to handle. For these reasons, several types of apparatus have been commercialized.

The current efficiency in ozone generation achieved by the conventional apparatus is usually from 13 to 18% and about 20% at the highest, and the resulting gas is water-saturated oxygen gas containing 13 to 18 wt % of ozone. Since the liquid component in this electrolytic system is deionized water that is regarded to be only slightly corrosive, the system does not entail wear of the electrodes, elution of other components, or incorporation of impurities, thereby providing a nearly pure, mixed gas.

Use of ozone, which has formerly been directed to sterilization, has recently been extending over the fields of precision engineering, such as washing of electronic parts. In this connection, the above-described solid electrolyte type ozone generator is disadvantageous in that it requires higher electric power than discharge type ozonizers. Depending on the discharge method, the power consumption usually ranges from 15 to 20 Wh/g-ozone (ozone concentration: 2 to 3%). In order to increase the ozone concentration obtained by the discharge method to about 10%, it is necessary to equip the apparatus with a cooling means and to replace air with oxygen as a starting gas. It is said that the power consumption under the thus altered conditions would be from 70 to 80 Wh/g-ozone. On the other hand, the method using a solid electrolyte, while always attaining an ozone concentration as high as 13 to 18%, requires a power consumption of 70 to 80 Wh/g-ozone, which has been a great problem waiting for a solution.

The causes of the high power consumption include, for example, the lower current efficiency (13 to 18%) in ozone generation by water electrolysis compared with ordinary electrolysis and involvement of evolution of hydrogen unnecessary for ozone production, which also consumes power. In addition, the by-produced hydrogen gas diffuses into the resulting ozone-containing gas in a proportion of from 0.1 to several percents.

Attempts to improve the current efficiency, and thereby to reduce the power consumption, have continued up to date. However, a means for carrying out ozone generation in a stable manner at a markedly improved current efficiency has not yet been developed.

As an approach for reducing the power consumption through control of hydrogen by-production, it has been proposed to use an oxygen gas cathode as reported in *Soda Kogyo Gijutsu Toronkai Yoshishu* (1992). In this method, the cathodic reaction accompanied by hydrogen evolution, $2H^{+}+2e^{-}\rightarrow H_{2}$, is converted to one involving no hydrogen evolution, $H_{2}O+\frac{1}{2}O_{2}+2e^{-}\rightarrow 2OH^{-}$, whereby the power consumption can be reduced by that assigned to hydrogen evolution. In fact, the voltage of from 3.1 to 3.6 V that is required when an oxygen gas cathode is not used can be reduced by 0.5 to 0.6 V. However, because the electrolysis according to this method is carried out at such a high current density of 50 A/dm$^2$ or more at a low temperature of 40° C. or lower, the overpotential inevitably becomes higher, resulting in an increase of heat generation. That is, the use of an oxygen gas cathode decreases the voltage but, in turn, necessitates a separate cooler or chiller. As a result, the overall reduction in energy seems to be very slight. Therefore, it has been necessary to develop a method for accomplishing efficient reduction in voltage.

SUMMARY OF THE INVENTION

An object of the present invention is to provide an electrolytic ozone generator which can be operated at a reduced electrolytic voltage without requiring any special cooling mechanism.

The present invention relates to an electrolytic ozone generator comprising a perfluorocarbon type cation exchange membrane as a solid electrolyte, a porous anode substance in intimate contact with one side of the membrane, and a porous cathode substance in intimate contact with the other side, in which deionized water is supplied to the anode side to conduct electrolysis to produce a mixed gas of ozone and oxygen, wherein the electrolysis is carried out while feeding air or oxygen-rich air to the cathode chamber side.

DETAILED DESCRIPTION OF THE INVENTION

Figure 1:
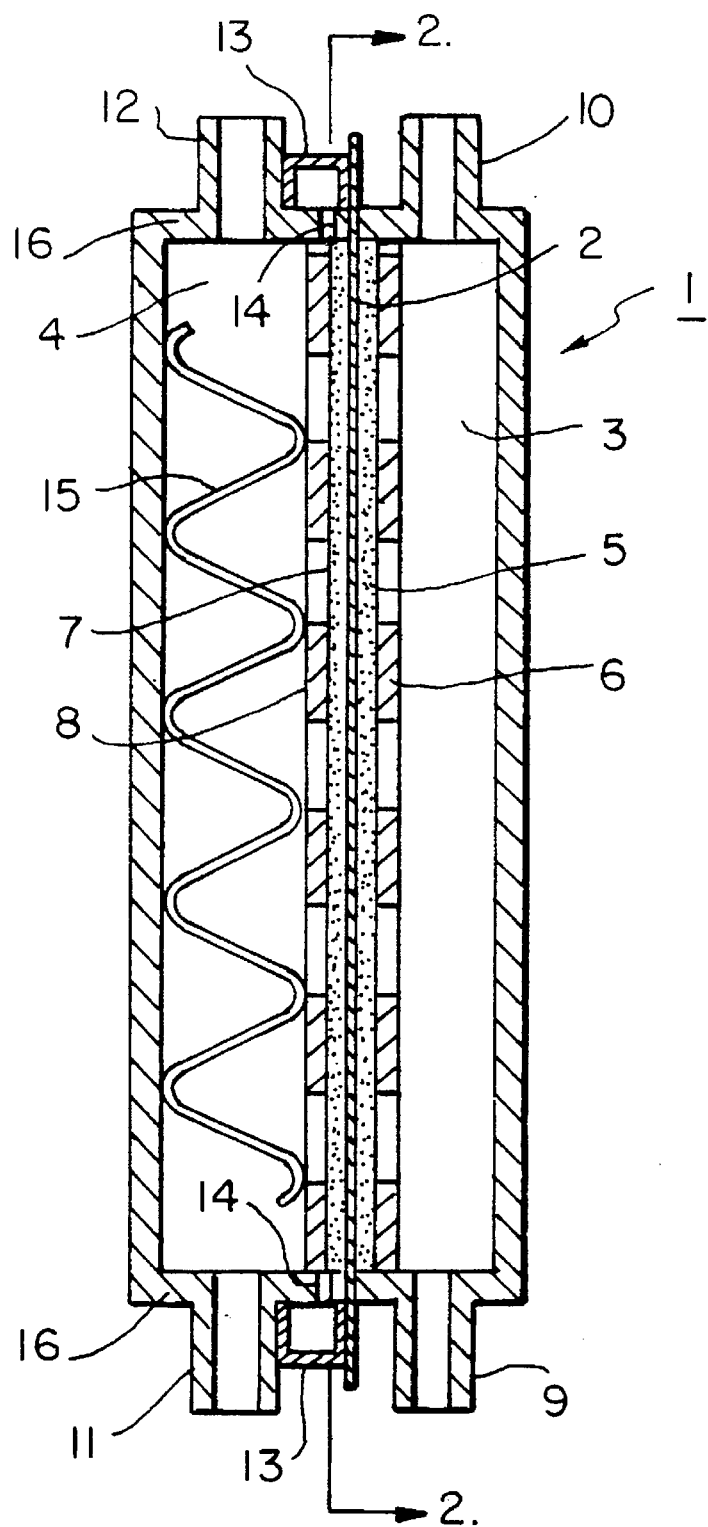
FIG. 1 is a longitudinal section of an example of the electrolytic ozone generator according to the present invention.

A gas electrode which has conventionally been used for depolarization comprises a hydrophobic membrane for retaining a gas by which a gas and a liquid are partitioned. Depolarization can be effected by a contact reaction between the liquid and the gas on the electrode substance distributed on the hydrophilic portion of the surface of the hydrophobic membrane. The system, in which gas-liquid interface and the gaseous phase are both relatively immobilized, produces a great depolarizing effect but has little cooling action on the heat generated.

In the present invention, air or oxygen-rich air is fed to the catholyte to saturate the liquid with air instead of using a gas electrode, thereby inducing a depolarizing reaction on the electrode surface between fine air bubbles and the liquid, i.e., a conversion of at least part of the cathodic reaction to the reaction $H_2O+½O_2+2e^-\rightarrow 2OH^-$. Thus, energy consumption accompanying hydrogen evolution can be suppressed. Further, the fine air bubbles cool the electrolytic solution while flowing therethrough, and at the same time, the catholyte evaporates with heat absorption. As a result, the temperature of the electrolytic solution can be kept low.

In conventional electrolytic methods, it has not been a practice to deionize the catholyte for reuse because part of the ozone generated in the anode chamber migrates to the cathode chamber and dissolves in the catholyte, and it has been difficult to purify such ion-containing water by passing it through an ion-exchange resin. In contrast, in the present invention, ozone decomposition is accelerated on contact with air or oxygen-rich air fed to the cathode chamber so that the catholyte can be subjected as such to deionization for reuse. This means a reduction in waste water and saves the need of the conventionally required periodical treatment of such water.

Each member constituting the electrolytic ozone generator of the present invention will be illustrated below.

The cation-exchange membrane (solid electrolyte) and the anode substance may be substantially the same as those employed in conventional ozone generators. The anode substance or cathode substance itself is not necessarily required to be porous, and a porous base carrying the anode substance or cathode substance thereon may be used.

The perfluorocarbon type cation exchange membrane which can be used in the present invention is not limited, but examples thereof include "Nafion 117" and "Nafion 150" (both produced by E.I. Du Pont de Nemours and Company), and "ACIPlex S1112" (produced by Asahi Chemical Industry Co., Ltd.).

β-Lead dioxide is usually used as an anode substance. Having low affinity to a wet ion-exchange membrane with no charge applied, the lead dioxide is not directly applied to the ion-exchange membrane but is preferably applied to a finely porous electrode base. The lead dioxide-coated electrode base is brought into firm contact with the ion-exchange membrane to form a so-called zero gap structure. Where β-lead dioxide, which gives rise to a corrosion problem depending on the operating conditions, is replaced with other electrode substances, the anode substance can be either directly applied to the ion-exchange membrane or formed into the above-mentioned zero gap structure, in accordance with the characteristics of the electrode substance selected. Where the anode substance comprises $PbO_2$, examples of the porous electrode base include a sintered titanium or a sintered titanium wire, a fine mesh (expanded mesh) of titanium, a woven mesh prepared by weaving titanium wires, and a punched plate of titanium. Where the anode substance is other than $PbO_2$ such as platinum, a porous sheet comprising carbon and PTFE (polytetrafluoro-ethylene) carrying platinum therein or on the surface, as well as the above-described examples, may be used.

Similarly, the cathode substance may be either applied directly to an ion-exchange resin or formed into a zero gap structure. In order to assure satisfactory mixing of supplied air with water, the zero gap structure is preferred to the direct coating which causes part of the electrode substance to be embedded into the ion-exchange membrane.

Where the cathode side is made into a zero gap type, a porous collector may be coated with the cathode substance, or a carrier carrying the cathode substance thereon (e.g., carbon carrying platinum black thereon) may be interposed between a collector and a cathode substrate. Examples of the porous collector include a fine expanded mesh of Ni or SUS, a woven mesh prepared by weaving wires of Ni or SUS, a porous sinter prepared by sintering a powder or fiber of Ni or SUS, and a punched plate of Ni or SUS. Examples of the carrier include a porous carbon, a sinter or sheet of graphite, a porous metal prepared by sintering a fiber or powder of Ni or SUS, and a mesh of Ni or SUS.

Carbon, a sintered graphite, and a porous sheet comprising a powder of carbon or graphite and PTFE as a binder, each may be used as the cathode as it is, since they are porous. Platinum or ruthenium may be further applied as a catalyst to the surface of these cathode substances. A porous cathode comprising a binder and a carbon carrying platinum or ruthenium thereon may be used.

In either case, air should reach to the vicinity of the cation-exchange membrane so as to produce the fullest depolarizing effect. To this effect, the through-holes of the aforesaid collector or carrier preferably have a large pore size, for example, from 10 to 100 μm. If the pore size is smaller than 10 μm, air tends to be inhibited from reaching to the vicinity of the cation-exchange membrane. If the pore size exceeds 100 μm, air is allowed to enter with ease, but the current distribution in the solid electrolyte tends to be localized.

The content of the through-holes contained in the porous cathode or anode is preferably from 50 to 90% with respect to the ratio by percentage of apparent specific gravity to true specific gravity.

The anode, cathode, and solid electrolyte are preferably hydrophilic so as to eliminate gas retention due to repulsion and thereby to enhance the effect of gas depolarization.

A suitable cathode can be prepared, for example, as follows:

A filter material having a thickness of about 1 mm and a pore size of from 100 to 200 μm obtained by sintering a stainless steel wire sheet is coated with a paste comprising graphite powder, graphite powder having thereon platinum black, and a phenolic resin binder and baked at 200° to 400° C. to obtain a cathode having through-holes having a diameter varying from 50 to 100 μm depending on the amount of the paste applied.

Then, an expanded nickel mesh having a thickness of about 0.5 mm or a porous nickel or stainless steel sheet having a pore size greater than 100 μm as a collector is brought into intimate contact with the above prepared cathode. A feeder is connected thereto via a 2 to 10 mm wide gap to form an electrolytic cell for ozone generation.

The manner of feeding air or oxygen-rich air to the cathode chamber is not particularly restricted as long as air may enter between the cathode substance and the solid electrolyte to perform sufficient depolarization. For example, air is supplied from the outside to the space in the rear of the above-mentioned collector and made to pass through the collector and the cathode to reach the vicinity of the solid electrolyte. In another example, a plurality of holes are radially provided on the wall of the electrolytic cell at the position corresponding to the interface between the solid electrolyte and the cathode, and an air chamber is formed on the outer side of the air holes. Air in the air chamber is supplied inward through the holes to the interface between the solid electrolyte and the cathode. An air filter may be provided in order to make the air bubbles supplied finer and to make the air supply more uniform.

When air is supplied to the cathode chamber side of the membrane, the supplied amount is preferably 4 times or more the theoretical amount of hydrogen evolved.

The pressure of the air supplied is preferably kept higher than the inner pressure of the cell by 0.1 to 2 atm so that air may be caused to flow countercurrently to the surface of the cathode against the basic flow of the electrolytic solution from the anode chamber toward the cathode chamber. The air bubbles thus blown into the catholyte strike the catholyte, thereby decomposing ozone which may come from the anode chamber. As a result, the electrolytic solution discharged from the cathode chamber is free from ozone and can be passed through an ion-exchange resin as it is to be converted to deionized water, which may be returned to the anode chamber.

Further, the electrolytic solution is cooled through heat absorption on the gas-liquid interface and the adiabatic expansion effect due to reduction in pressure of the air. Therefore, there is no need to equip the cell with a separate cooling mechanism, such as a water jacket, as required in conventional apparatus.

The amount of hydrogen gas evolved in the cathode side is reduced by the action of depolarization, and the concentration of the evolved hydrogen gas, as diluted with the supplied air, is always kept out of the range of explosion. Thus, the catholyte can be discharged as such without requiring a treatment of hydrogen.

Figure 2:
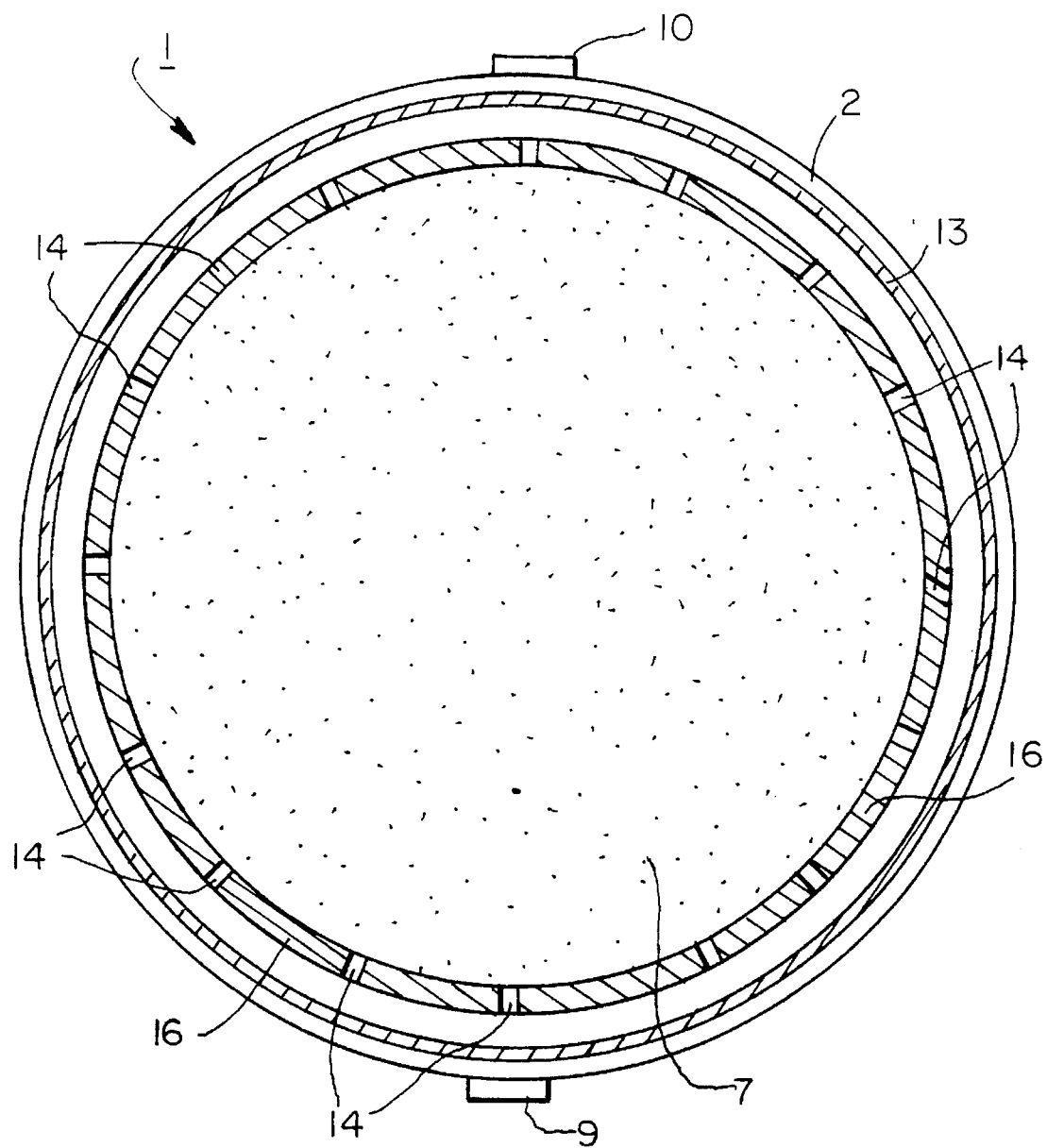
FIG. 2 is a longitudinal section of the ozone generator shown in FIG. 1 along line A—A.

The electrolytic ozone generator according to the present invention is explained below by reference to the accompanying drawings. FIG. 1 is a longitudinal section of one example, and FIG. 2 is a longitudinal section of the apparatus shown in FIG. 1 along line A—A.

Electrolytic cell 1, an ozone generator, is partitioned with perfluorocarbon sulfonic acid type cation-exchange resin 2 (solid electrolyte) into anode chamber 3 and cathode chamber 4. On the anode chamber side and the cathode chamber side of ion-exchange membrane 2, anode collector 6 coated with anode substance 5 and cathode collector 8 coated with cathode substance 7, respectively, both in intimate contact with ion-exchange membrane 2 to form a zero gap type structure are provided.

Anolyte inlet 9 and anolyte outlet 10 are formed at the lower and upper parts of anode chamber 3, respectively. Catholyte inlet 11 and outlet 12 for withdrawing the catholyte and ozone are formed at the lower and upper parts of cathode chamber 4, respectively.

Ring air chamber 13 is provided along the peripheral wall 16 of cathode chamber 4 between anolyte inlet 9 and outlet 10 and between catholyte inlet 11 and outlet 12. Air chamber 13 is connected to cathode chamber 4 through a plurality of air holes 14 which are radially provided on the peripheral wall 16 of the cell at the position corresponding to the interface between cathode substance 7 and cathode collector 8. A pressure higher than the inner pressure of the cell is applied to air chamber 13 to feed air or oxygen-rich air from air chamber 13 to cathode chamber 4. The thus fed air or oxygen-rich air permeates cathode substance 7 and reaches the surface of solid electrolyte 2 to conduct gas depolarization. Air holes 14 may be formed at positions closer to solid electrolyte 2. Numeral 15 is a feeder placed in the cathode chamber between cathode collector 8 and the cell wall.

The air or oxygen-rich air thus supplied cools the catholyte and thus eliminates the need of providing a separate cooling mechanism. Further, the air or oxygen-rich air bubbles strike the ozone gas which may come from anode chamber 3 into the cathode chamber side through solid electrolyte 2 and decomposes it, making it possible to deionize the catholyte as withdrawn from the cathode chamber and to recycle the deionized water to the anode chamber.

The present invention will now be illustrated in greater detail with reference to the following Examples, but it should be understood that the present invention is not construed as being limited thereto.

EXAMPLE 1

A circular electrolytic cell having the structure shown in FIG. 1 (diameter: 60 mm; electrode area: 100 cm$^2$) was assembled by using the following materials:

Solid Electrolyte

A perfluorosulfonic acid type cation-exchange resin "Nafion 117" (produced by E.I. Du Pont de Nemours and Company).

Anode

A 3 mm thick sintered titanium fiber, as a base, was coated with titanium/tantalum/platinum (40:10:50 mol %) by thermal decomposition of a titanium-tantalum oxide, added with platinum. A thin film of α-lead dioxide was formed thereon, and β-lead dioxide was further deposited thereon by electrodeposition.

Anode Collector

A porous sintered titanium having a thickness of 5 mm and a pore size of from 200 to 500 μm was utilized.

Cathode

A porous sinter of SUS 316, having a thickness of 2 mm and a through-hole diameter of 100 to 200 μm, was coated with a paste comprising graphite powder having a particle size of 0.5 to 20 μm and a phenolic resin binder and baked in an oven at 350° C. An amyl alcohol suspension of graphite powder having supported thereon platinum black was applied in a thin layer to the sinter and baked at 450° C.

Cathode Collector

An unrolled expanded nickel mesh having a plate thickness of 1 mm and an apparent thickness of 5 mm was placed between the cathode and the cell wall via a 0.5 mm thick nickel fine mesh, to serve as a cathode collector, feeder, loose material and spacer.

Air was supplied from a ring air chamber provided on the outer wall of the cell between the electrolyte inlets and outlets of the cathode chamber inward at a rate of 1.5 kg/cm$^2$ (21 liter/min on atmospheric pressure conversion), amounting to 30 times the theoretical amount of hydrogen evolved.

Electrolysis was carried on at a current density of 100 A/dm$^2$ while feeding air to the cathode chamber. The electrolytic voltage was 3.0 V. The temperature of the electrolytic solution, which was 20° C. at the beginning, showed no change during the electrolysis. The proportion of hydrogen gas in the cathode gas was 2% or less, which was below the explosion limit.

Thereafter, air feed was stopped. Thirty minutes from the stop, the temperature of the electrolytic solution elevated up to 25° C., the electrolytic voltage increased to 3.2 V, and the cathode gas comprised hydrogen and required treatment in the presence of a catalyst for hydrogen decomposition.

It is, thus, seen that supply of air effects a saving of about 0.2 V in voltage, and that the temperature of the electrolytic solution can be maintained at the initial level without equipping the cell with a separate cooling mechanism.

As described above, the present invention provides an electrolytic ozone generator comprising a perfluorocarbon type cation exchange membrane as a solid electrolyte, a porous anode substance in intimate contact with one side of the membrane, and a porous cathode substance in intimate contact with the other side, in which deionized water is supplied to the anode side to conduct electrolysis to produce a mixed gas of ozone and oxygen. The electrolysis is carried out while feeding air or oxygen-rich air to the cathode chamber side.

According to the present invention, air or oxygen-rich air fed to the cathode chamber side controls hydrogen gas evolution, affording a saving of electric power for hydrogen gas evolution. The saving of power is comparable to that achieved by the conventional gas electrode. That is, the fitting of an expensive gas electrode into an electrolytic cell with labor can be replaced with a simple operation of supplying air to the cathode chamber to accomplish the same result of power reduction.

Further, supply of air or oxygen-rich air into the cathode chamber results in heat absorption on the interface between air bubbles and the catholyte and production of an adiabatic expansion effect due to the reduction in air pressure, to thereby cool the catholyte. As a result, the electrolytic cell does not need to be equipped with a separate cooling mechanism as has hitherto been required and thus achieves size reduction.

Furthermore, ozone generated in the anode chamber sometimes permeates the solid electrolyte into the cathode chamber but is decomposed there on contact with air supplied thereto. Accordingly, the electrolytic solution withdrawn from the cathode chamber is free from ozone and may be deionized using an ion-exchange resin having no resistance to ozone and can be recycled to the anode chamber.

As previously stated, not only suppression of hydrogen gas evolution in the cathode chamber, but also dilution of the hydrogen gas generated with air, keep the hydrogen gas level in the cathode chamber below the explosion limit. The gas from the cathode chamber can thus be scattered in the atmosphere without danger.

While the means for supplying air or oxygen-rich air is not particularly limited, it is preferable to supply air or oxygen-rich air through a plurality of holes radially provided on the peripheral wall of the cathode chamber, whereby a sufficient amount of air may be supplied to the solid electrolyte and the cathode substance to surely produce the effects of the present invention.

While the invention has been described in detail and with reference to specific examples thereof, it will be apparent to one skilled in the art that various changes and modifications can be made therein without departing from the spirit and scope of the invention.

What is claimed is:

1. An electrolytic ozone generator comprising an anode chamber and a cathode chamber separated by a perfluorocarbon cation exchange membrane as a solid electrolyte with a surface of said membrane facing said anode chamber and a surface of said membrane facing said cathode chamber, a porous anode substance in intimate contact with the surface of the membrane facing the anode chamber, and a porous cathode substance in intimate contact with the surface of the membrane facing the cathode chamber, further including:

(i) means for supplying deionized water to the anode chamber;
   (ii) means for supplying catholyte to the cathode chamber;
   (iii) means to feed air or oxygen-rich air to the cathode chamber; and
   (iv) a peripheral wall of the cathode chamber wherein said peripheral wall contains a plurality of radial holes through which said air or oxygen-rich air is fed and said holes correspond to the position of the interface between said solid electrolyte and said cathode substance.

2. The electrolytic ozone generator according to claim 1, wherein said cathode substance is either applied directly to an ion-exchange resin or formed into a zero gap structure.

3. The electrolytic ozone generator according to claim 2, wherein, when said cathode substance is formed into a zero gap structure, a porous collector is coated with said cathode substance or a carrier is interposed between said collector and said cathode substance.

4. The electrolytic ozone generator according to claim 3, wherein said collector or carrier has through-holes.

5. The electrolytic ozone generator according to claim 4, wherein said through-holes have a pore size of 10 μm to 100 μm.

6. The electrolytic ozone generator according to claim 1, wherein said anode substance is β-lead dioxide.

* * * * *